US010863514B2

(12) United States Patent
Wu

(10) Patent No.: US 10,863,514 B2
(45) **Date of Patent: *Dec. 8, 2020**

(54) DEVICE AND METHOD OF HANDLING NARROWBAND INTERNET OF THINGS COMMUNICATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,955

(22) Filed: Apr. 16, 2019

(65) Prior Publication Data

US 2019/0246390 A1 Aug. 8, 2019

Related U.S. Application Data

(62) Division of application No. 15/671,158, filed on Aug. 8, 2017, now Pat. No. 10,314,045.

(Continued)

(51) Int. Cl.
*H04W 72/04* (2009.01)
*H04W 48/12* (2009.01)

(Continued)

(52) U.S. Cl.
CPC ........... *H04W 72/048* (2013.01); *H04L 67/12* (2013.01); *H04W 48/10* (2013.01); *H04W 48/12* (2013.01);

(Continued)

(58) Field of Classification Search
CPC ..... H04W 76/19; H04W 76/18; H04W 76/14; H04W 76/15; H04W 76/27; H04W 88/02;

(Continued)

(56) References Cited

U.S. PATENT DOCUMENTS

2010/0329211 A1 12/2010 Ou
2012/0057474 A1* 3/2012 Hirano .................. H04W 36/24 370/248

(Continued)

FOREIGN PATENT DOCUMENTS

CN 101938828 A 1/2011
WO 2018/016895 A1 1/2018

OTHER PUBLICATIONS

3GPP TS 36.300 V13.4.0 (Jun. 2006) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

(Continued)

*Primary Examiner* — Asad M Nawaz
*Assistant Examiner* — Najeeb Ansari
(74) *Attorney, Agent, or Firm* — Winston Hsu

(57) ABSTRACT

A communication device for handling a narrowband internet of things (NB-IoT) communication comprises a storage device for storing instructions and a processing circuit coupled to the storage device. The processing circuit is configured to execute the instructions stored in the storage device. The instructions comprise initiating a radio resource control (RRC) connection reestablishment procedure for a NB-IoT communication; selecting a NB-IoT cell, when initiating the RRC connection reestablishment procedure; receiving a SystemInformationBlockType2-NB message broadcasted by the NB-IoT cell; and using a timeAlignmentTimerCommon comprised in the SystemInformationBlockType2-NB for an uplink (UL) transmission.

8 Claims, 7 Drawing Sheets

40

Start — 400

Initiate a RRC connection reestablishment procedure for a NB-IoT communication — 402

Select a NB-IoT cell, when initiating the RRC connection reestablishment procedure — 404

Receive a SystemInformationBlockType2-NB message broadcasted by the NB-IoT cell — 406

Use a timeAlignmentTimerCommon comprised in the SystemInformationBlockType2-NB for a UL transmission — 408

End — 410

Related U.S. Application Data

(60) Provisional application No. 62/372,766, filed on Aug. 9, 2016.

(51) Int. Cl.
*H04W 76/19* (2018.01)
*H04L 29/08* (2006.01)
*H04W 48/10* (2009.01)
*H04W 36/14* (2009.01)
*H04W 88/06* (2009.01)
*H04W 56/00* (2009.01)

(52) U.S. Cl.
CPC ............ *H04W 76/19* (2018.02); *H04W 36/14* (2013.01); *H04W 56/001* (2013.01); *H04W 88/06* (2013.01)

(58) Field of Classification Search
CPC ... H04W 72/042; H04W 24/10; H04W 72/02; H04W 88/06; H04W 88/08; H04W 72/048; H04W 76/10; H04W 24/08; H04W 72/0413
See application file for complete search history.

(56) References Cited

U.S. PATENT DOCUMENTS

2013/0022015 A1* 1/2013 Jung ........................ H04L 5/001 370/329
2013/0114576 A1 5/2013 Kwon
2013/0188473 A1* 7/2013 Dinan ............... H04W 56/0005 370/216
2013/0279433 A1* 10/2013 Dinan ................. H04W 52/146 370/329
2014/0016593 A1 1/2014 Park
2014/0086224 A1 3/2014 Kwon
2015/0327139 A1 11/2015 Sirotkin
2016/0295537 A1* 10/2016 Langereis ......... H04W 56/0005
2016/0295609 A1* 10/2016 Vajapeyam ............... H04L 5/14
2017/0251455 A1* 8/2017 Shin .................. H04W 56/0015
2018/0007574 A1 1/2018 Park
2018/0070278 A1 3/2018 Uemura
2018/0070403 A1* 3/2018 Uemura .................. H04W 4/70
2018/0077734 A1* 3/2018 Kim .......................... H04L 1/18
2018/0212800 A1* 7/2018 Park .......................... H04L 1/00
2018/0294910 A1* 10/2018 Kim .................... H04L 27/2613
2018/0324675 A1* 11/2018 Lee ....................... H04W 48/06

OTHER PUBLICATIONS

3GPP TS 36.331 V13.2.0 (Jun. 2006) Technical Specification 3rd Generation Partnership Project; Technical Specification Group Radio Access Network; Evolved Universal Terrestrial Radio Access (E-UTRA); Radio Resource Control (RRC); Protocol specification (Release 13).
3GPP TS 36.213 V13.2.0 (Jun. 2016) Technical Specification 3rd Generation Partnership Project; Technical Specification Group Radio Access Network; Evolved Universal Terrestrial Radio Access (E-UTRA); Physical layer procedures (Release 13).
3GPP TS 36.211 V13.2.0 (Jun. 2016) Technical Specification 3rd Generation Partnership Project; Technical Specification Group Radio Access Network; Evolved Universal Terrestrial Radio Access (E-UTRA); Physical channels and modulation (Release 13).
Search Report dated Jan. 4, 2018 for EP application No. 17185516.6, pp. 1-14.
Huawei (Rapporteur), "Comments on 36.331 Running CR to capture agreements on Nb-IoT", 3GPP TSG-RAN WG2#93 Meeting, R2-162968, Apr. 11-15, 2016, Dubrovnik, Croatia, XP051082702, pp. 1-62.
3GPP TS 36.331 V13.2.0 (Jun. 2016), "3rd Generation Partnership Project; Technical Specification Group Radio Access Network; Evolved Universal Terrestrial Radio Access (E-UTRA); Radio Resource Control (RRC); Protocol specification (Release 13)", XP051123115, pp. 1-623.
HTC, "Corrections to NB-IoT SystemInformationBlockType2 handling", 3GPP TSG-RAN2 Meeting #96, R2-167717, Nov. 14-18, 2016, Reno, USA, XP051191858, pp. 1-4.
Search Report dated May 2, 2018 for EP application No. 18155891.7, pp. 1-5.
Office action dated May 18, 2018 for the Taiwan application No. 106126975, filed Aug. 9, 2017, p. 1-8.
Office action dated Dec. 6, 2019 for the China application No. 201710676469.0, filing date Aug. 9, 2017, pp. 1-7.
3GPP TS 36.331 V13.2.0 (Jun. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 13).
Huawei (Rapporteur), "Comments on 36.331 Running CR to capture agreements on NB-IoT", 3GPP TSG-RAN WG2#93 Meeting, R2-162968, Apr. 11-15, 2016, Dubrovnik, Croatia, pp. 1-62.

* cited by examiner

DEVICE AND METHOD OF HANDLING NARROWBAND INTERNET OF THINGS COMMUNICATION

CROSS REFERENCE TO RELATED APPLICATIONS

This application is a divisional application of U.S. application Ser. No. 15/671,158, filed on Aug. 8, 2017, which claims the benefit of U.S. Provisional Application No. 62/372,766 filed on Aug. 9, 2016.

BACKGROUND OF THE INVENTION

1. Field of the Invention

The present invention relates to a device and a method used in a wireless communication system, and more particularly, to a device and a method of handling a narrowband internet of things (NB-IoT) communication.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. The core network may include mobility management and Quality of Service (QoS) control for the UE.

SUMMARY OF THE INVENTION

The present invention therefore provides a communication device and method for handling a narrowband Internet of Things (NB-IoT) communication to solve the abovementioned problem.

A communication device for handling a narrowband internet of things (NB-IoT) communication comprises a storage device for storing instructions and a processing circuit coupled to the storage device. The processing circuit is configured to execute the instructions stored in the storage device. The instructions comprise initiating a radio resource control (RRC) connection reestablishment procedure for a NB-IoT communication; selecting a NB-IoT cell, when initiating the RRC connection reestablishment procedure; receiving a SystemInformationBlockType2-NB message broadcasted by the NB-IoT cell; and using a timeAlignmentTimerCommon comprised in the SystemInformationBlockType2-NB for an uplink (UL) transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
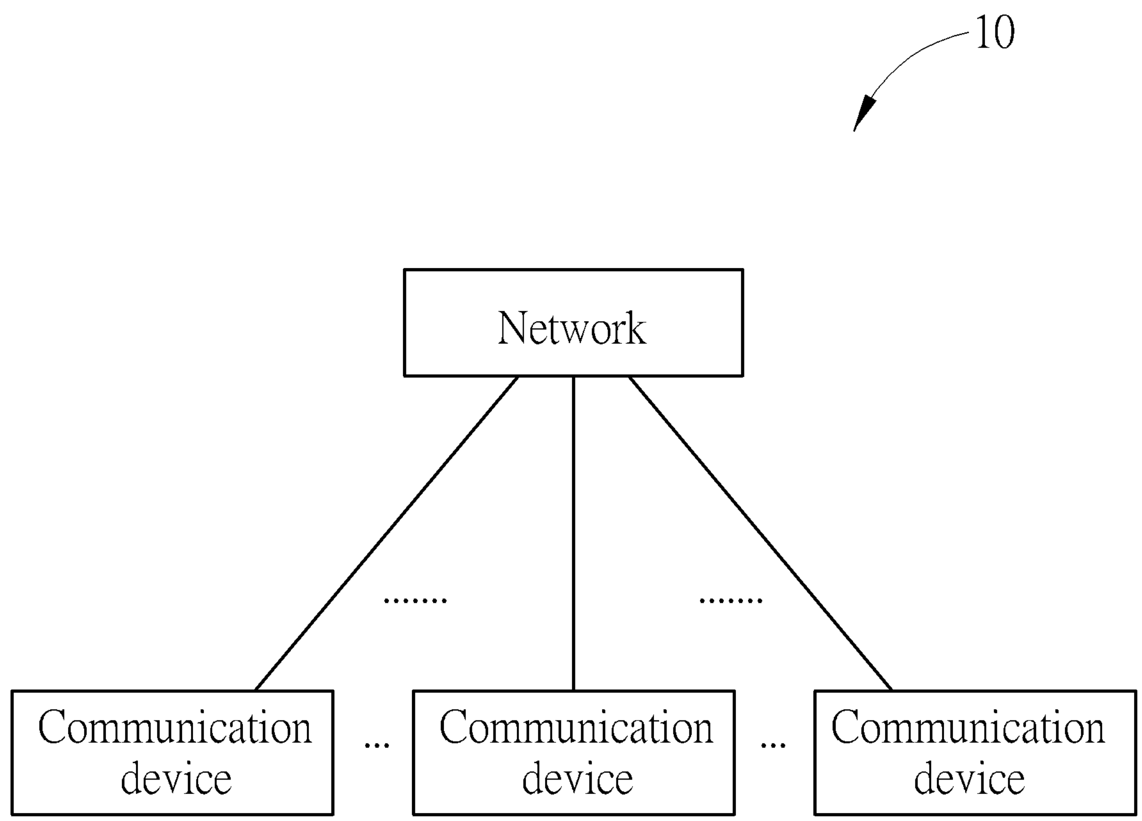
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device communicate with each other via a cell on one or more carriers.

In FIG. 1, the network and the communication devices are simply utilized for illustrating the structure of the wireless communication system 10. The network may include a radio access network (RAN) including at least one base station (BS). The RAN may be an evolved universal terrestrial radio access network (E-UTRAN) including at least one evolved Node-B (eNB). The RAN may be a fifth generation (5G) network including at least one 5G BS (e.g., gNB) which employs orthogonal frequency-division multiplexing (OFDM) and/or non-OFDM and a transmission time interval (TTI) shorter than 1 ms (e.g., 100 or 200 microseconds), to communicate with the communication devices. In general, a BS may also be used to refer any of the eNB and the 5G BS. Furthermore, the network may also include a core network which includes network entities connecting to the RAN.

A communication device may be a user equipment (UE), a narrowband Internet of Things (NB-IoT) UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
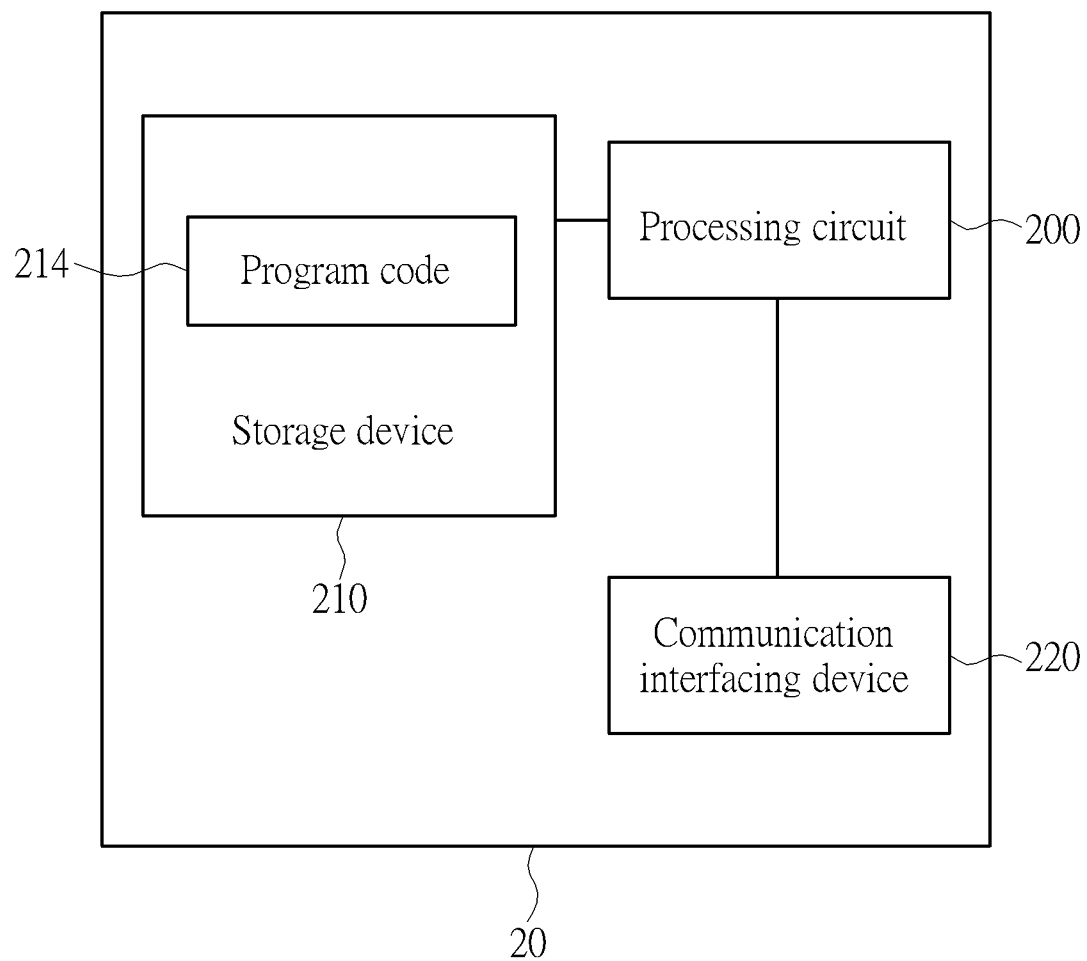
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver transmitting and receiving signals (e.g., data, messages and/or packets) according to processing results of the processing circuit 200.

In the following embodiments, a UE is used to represent a communication device in FIG. 1, to simplify the illustration of the embodiments.

A scenario assumed according to an example of the present invention is stated as follows. A NB-IoT UE may be configured with a radio resource control (RRC) connection by a BS. When the NB-IoT UE receives an RRCConnectionReconfiguration-NB message which indicates a full configuration but does not include a mobilityControlInfo, the UE uses values for timers T301, T310, T311 and constants N310, N311, as included in ue-TimersAndConstants received in SystemInformationBlockType2. However, the NB-IoT UE may not be able to receive the SystemInformationBlockType2, since the NB-IoT UE may not be capable of performing a LTE communication. Thus, the UE does not have the values for the timers T301, T310, T311 and the constants N310, N311.

Figure 3:
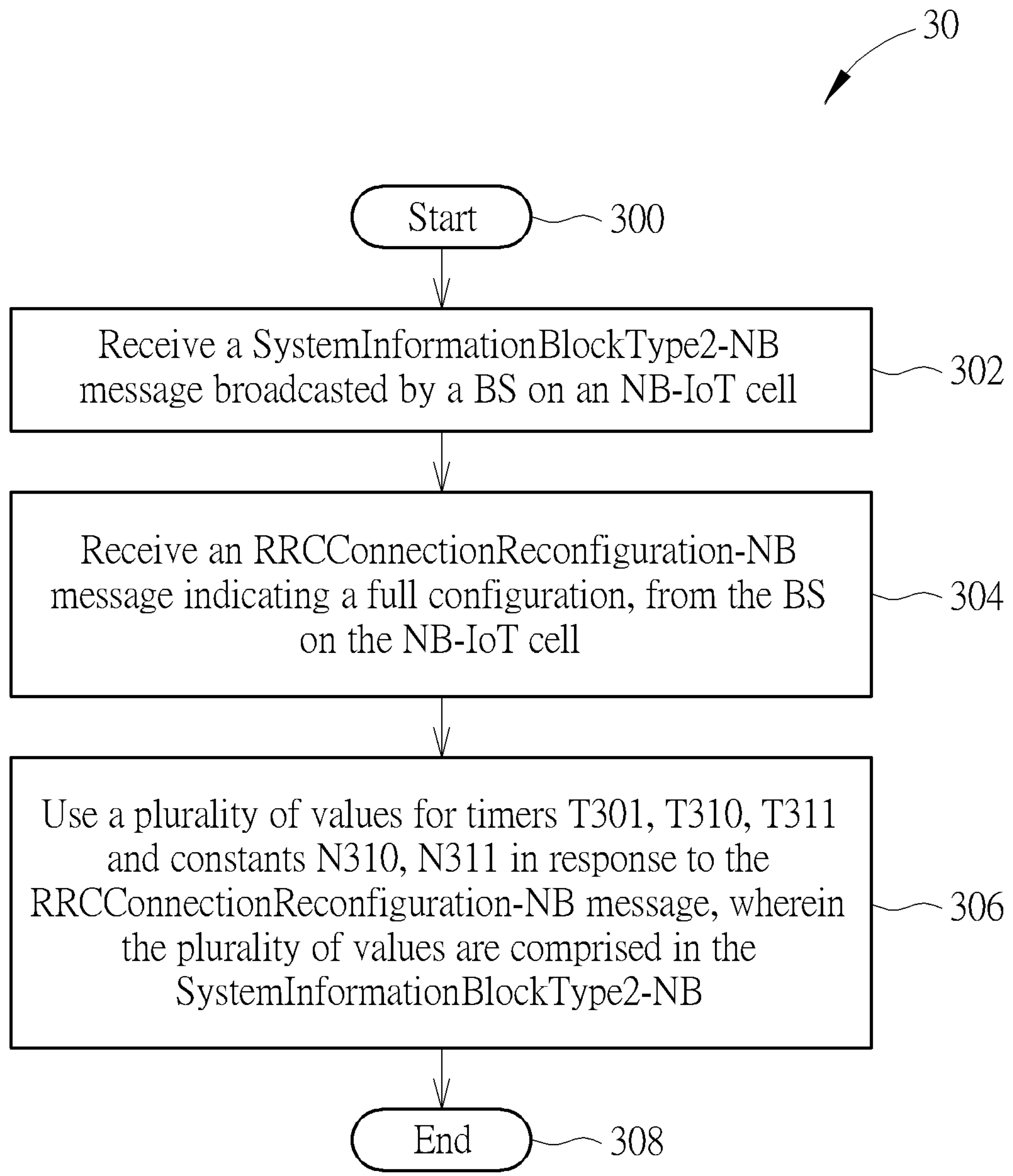
FIG. 3 is a flowchart of a process according to an example of the present invention.

FIG. 3 is a flowchart of a process 30 according to an example of the present invention. The process 30 may be utilized in a UE (e.g., NB-IoT UE) to communicate with a BS (e.g., in the network in FIG. 1), and includes the following steps:

Step 300: Start.

Step 302: Receive a SystemInformationBlockType2-NB message broadcasted by a BS on an NB-IoT cell.

Step 304: Receive an RRCConnectionReconfiguration-NB message indicating a full configuration, from the BS on the NB-IoT cell.

Step 306: Use a plurality of values for timers T301, T310, T311 and constants N310, N311 in response to the RRCConnectionReconfiguration-NB message, wherein the plurality of values are comprised in the SystemInformationBlockType2-NB.

Step 308: End.

According to the process 30, the UE receives a SystemInformationBlockType2-NB message broadcasted by a BS on a NB-IoT cell. The UE receives an RRCConnectionReconfiguration-NB message indicating a full configuration, from the BS on the NB-IoT cell. The UE uses (e.g., applies) a plurality of values for timers T301, T310, T311 and constants (i.e., for counter) N310, N311 in response to the RRCConnectionReconfiguration-NB message, wherein the plurality of values are included in the SystemInformationBlockType2-NB. Thus, the problem occurs in the above scenario is solved.

Realization of the process 30 is not limited to the above description. The following examples may be applied to the process 30.

When starting the timers, the UE uses the plurality of values included in the SystemInformationBlockType2-NB. When counting the number of consecutive "out-of-sync" indications for the NB-IoT cell, the UE uses the constant for N310 in the SystemInformationBlockType2-NB. When counting the number of consecutive "in-sync" indications for the NB-IoT cell, the UE uses the constant for N311 in the SystemInformationBlockType2-NB. In one example, the UE starts the timer T310 when detecting N310 consecutive "out-of-sync" indications for the NB-IoT cell. When the timer T310 expires, the UE starts the timer T311. The UE starts the timer T301, when the UE selects the NB-IoT cell while the timer T311 is running. The UE stops the timer T310, when detecting N311 consecutive "in-sync" indications for the NB-IoT cell.

A scenario assumed according to an example of the present invention is stated as follows. A NB-IoT UE may be configured with a RRC connection and a data radio bearer (DRB) by a BS. The NB-IoT UE may detect a failure on a radio link (e.g., radio link failure (RLF)) with the BS, and may initiate a RRC connection reestablishment procedure. When the NB-IoT UE selects an NB-IoT cell, the NB-IoT UE is not able to receive a SystemInformationBlockType2 which is only broadcasted in a LTE cell. Thus, the NB-IoT UE is not able to apply a timeAlignmentTimerCommon included in the SystemInformationBlockType2.

Figure 4:
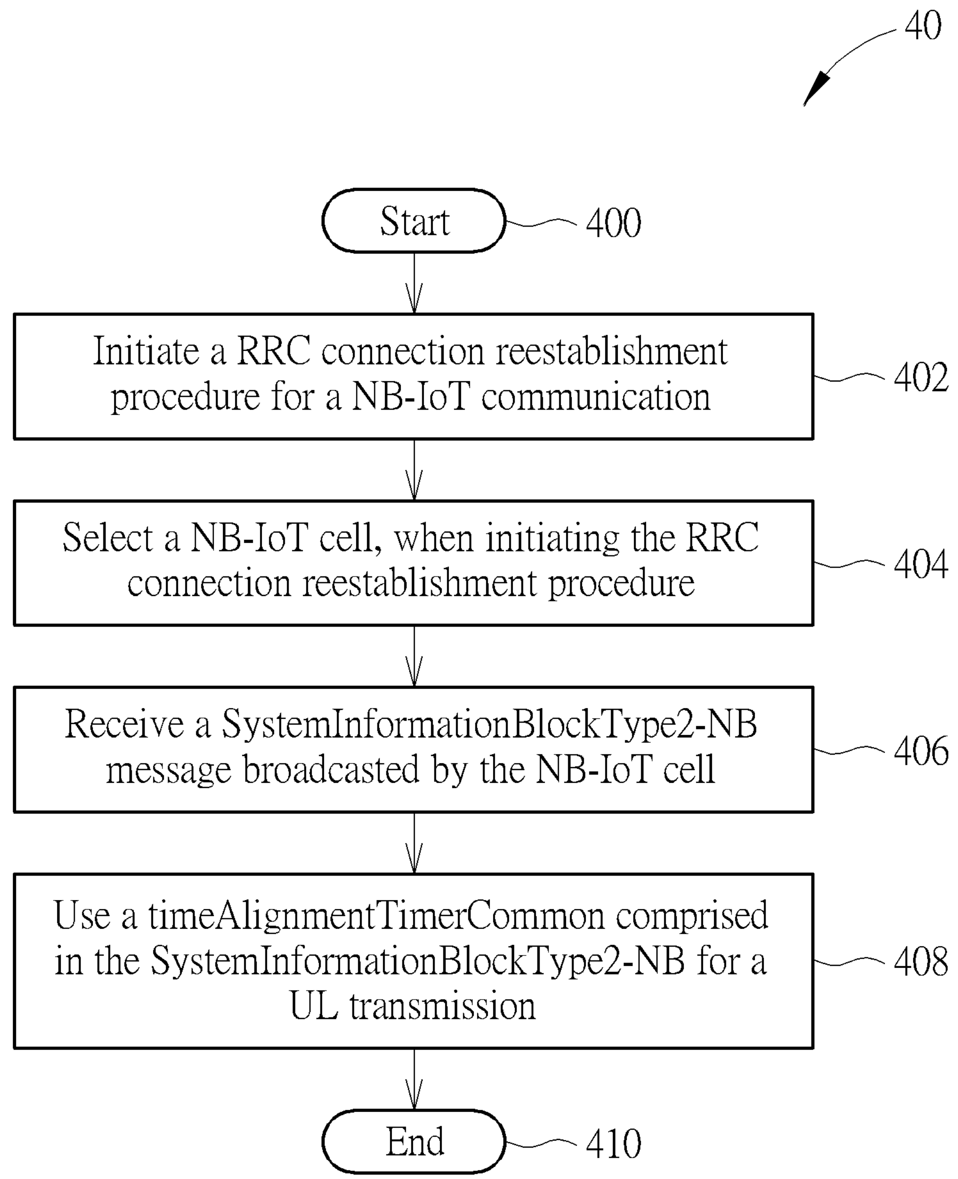
FIG. 4 is a flowchart of a process according to an example of the present invention.

FIG. 4 is a flowchart of a process 40 according to an example of the present invention. The process 40 may be utilized in a UE (e.g., NB-IoT UE) to communicate with a BS (e.g., in the network in FIG. 1), and includes the following steps:

Step 400: Start.

Step 402: Initiate a RRC connection reestablishment procedure for a NB-IoT communication.

Step 404: Select a NB-IoT cell, when initiating the RRC connection reestablishment procedure.

Step 406: Receive a SystemInformationBlockType2-NB message broadcasted by the NB-IoT cell.

Step 408: Use a timeAlignmentTimerCommon comprised in the SystemInformationBlockType2-NB for a UL transmission.

Step 410: End.

According to the process 40, the UE initiates a RRC connection reestablishment procedure for a NB-IoT communication. The UE selects a NB-IoT cell, when initiating the RRC connection reestablishment procedure. The UE receives a SystemInformationBlockType2-NB message broadcasted by the NB-IoT cell. The UE uses (e.g., applies) a timeAlignmentTimerCommon comprised in the SystemInformationBlockType2-NB. Then, the UE transmits an RRCConnectionReestablishmentRequest-NB to the NB-IoT cell, receives a RRCConnectionReestablishment-NB from the NB-IoT cell, and transmits a RRCConnectionReestablishmentRequest-NB to the NB-IoT cell. Thus, the problem occurs in the above scenario is solved.

Realization of the process 40 is not limited to the above description. The following examples may be applied to the process 40.

In one example, the step of using the timeAlignmentTimerCommon comprises that the UE starts a time alignment timer according to (e.g., by using) a value in the timeAlignmentTimerCommon when applying a timing advance command received from the NB-IoT cell. Further, the NB-IoT cell transmits a random access response comprising the timing advance command to the UE, in response to a random access preamble received from the UE. The UE may transmit a RRCConnectionReestablishmentRequest-NB, after receiving the random access response. In one example, the NB-IoT cell transmits a Medium Access Control (MAC) Protocol Data Unit (PDU) comprising the timing advance command to the UE, after performing the RRC connection reestablishment procedure with the UE. In the above examples, the operations of the NB-IoT cell may imply corresponding operations of the UE, which are not narrated herein.

In one example, the process 30 may be combined with the process 40. The UE receives a RRCConnectionReconfiguration-NB message indicating a full configuration, from the NB-IoT cell, after completing the RRC connection reestablishment procedure with the NB-IoT cell. The UE uses values for timers T301, T310, T311 and constants N310, N311 in response to the RRCConnectionReconfiguration-NB message, wherein the values are included in the SystemInformationBlockType2-NB.

A scenario assumed according to an example of the present invention is stated as follows. A NB-IoT UE is configured with a RRC connection and a DRB by a first BS. The NB-IoT UE may detect a failure on a radio link (e.g., RLF) with the first BS, and may initiate a RRC connection reestablishment procedure in response to the RLF. The NB-IoT UE may select a LTE cell of a second BS, and may transmit an RRCConnectionReestablishmentRequest message to the LTE cell if the NB-IoT UE supports the LTE communication besides the NB-IoT communication. However, the second BS may transmit an RRCConnectionReestablishmentReject message on the LTE cell to the NB-IoT UE, since the second BS does not have a LTE context of the NB-IoT UE. It should be noted the first BS and second BS may be the same or different.

Figure 5:
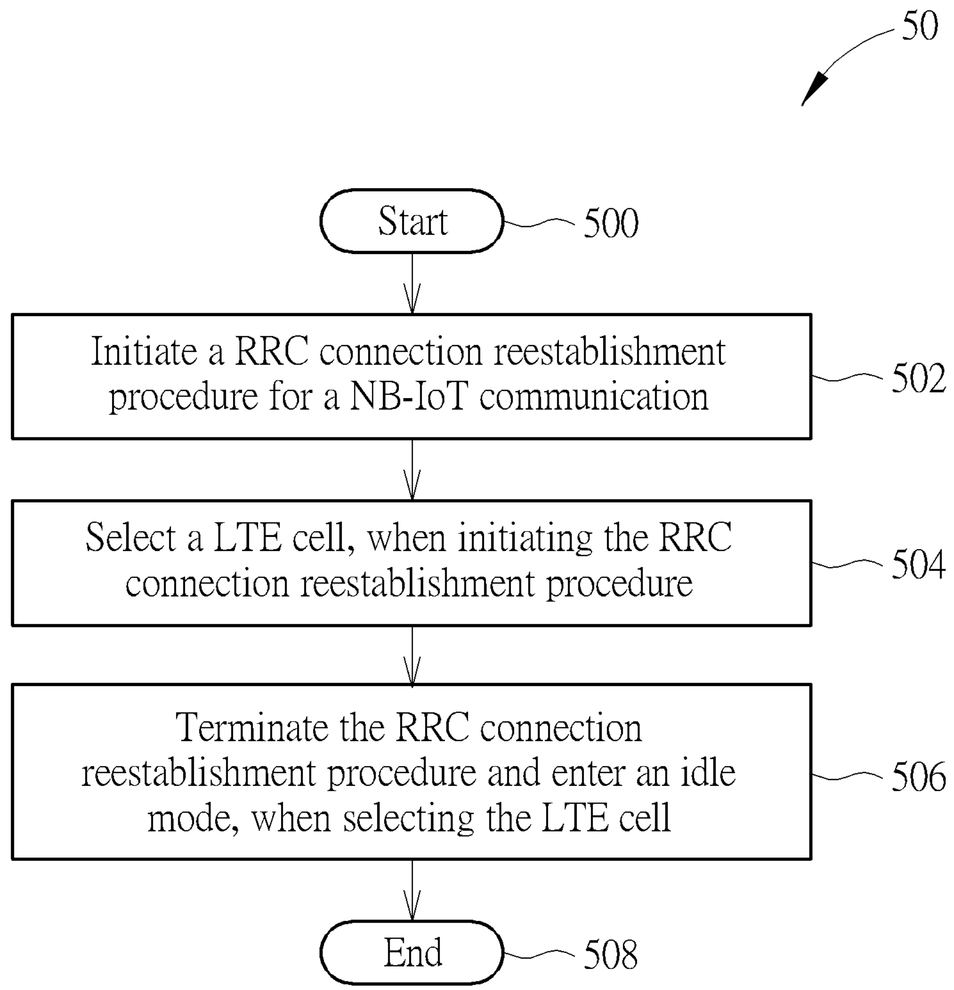
FIG. 5 is a flowchart of a process according to an example of the present invention.

FIG. 5 is a flowchart of a process 50 according to an example of the present invention. The process 50 may be utilized in a UE (e.g., NB-IoT UE) to communicate with a BS (e.g., in the network in FIG. 1), and includes the following steps:

Step 500: Start.

Step 502: Initiate a RRC connection reestablishment procedure for a NB-IoT communication.

Step 504: Select a LTE cell, when initiating the RRC connection reestablishment procedure.

Step 506: Terminate the RRC connection reestablishment procedure and enter an idle mode, when selecting the LTE cell.

Step 508: End.

In one example, the UE may initiate a RRC connection reestablishment procedure due to detecting a RLF on a NB-IoT cell. The UE may select a LTE cell (e.g., because the UE cannot find any NB-IoT cell) in response to the RRC connection reestablishment procedure.

In one example, the UE initiates a RRC connection establishment procedure by transmitting an RRCConnectionRequest message to the LTE cell, when selecting the LTE cell. That is, the UE transmits the RRCConnectionRequest message to the LTE cell instead of an RRCConnectionReestablishmentRequest message. The UE receives an RRCConnectionSetup message from the LTE cell in response to the RRCConnectionRequest message. Thus, the UE does not need to perform the RRC connection reestablishment procedure for a LTE communication. Time for performing the RRC connection reestablishment procedure is saved.

A scenario assumed according to an example of the present invention is stated as follows. A UE is configured with a RRC connection and a DRB by a first BS via a LTE communication. The UE may detect a failure on a radio link (e.g., RLF) with the first BS, and may initiate a RRC connection reestablishment procedure in response to the RLF. The UE may select a NB-IoT cell of a second BS, and may transmit an RRCConnectionReestablishmentRequest message to the NB-IoT cell if the UE supports a NB-IoT communication. However, the second BS may transmit an RRCConnectionReestablishmentReject message on the NB-IoT cell to the UE, since the second BS does not have a NB-IoT context of the UE. It should be noted the first BS and second BS may be the same or different.

Figure 6:
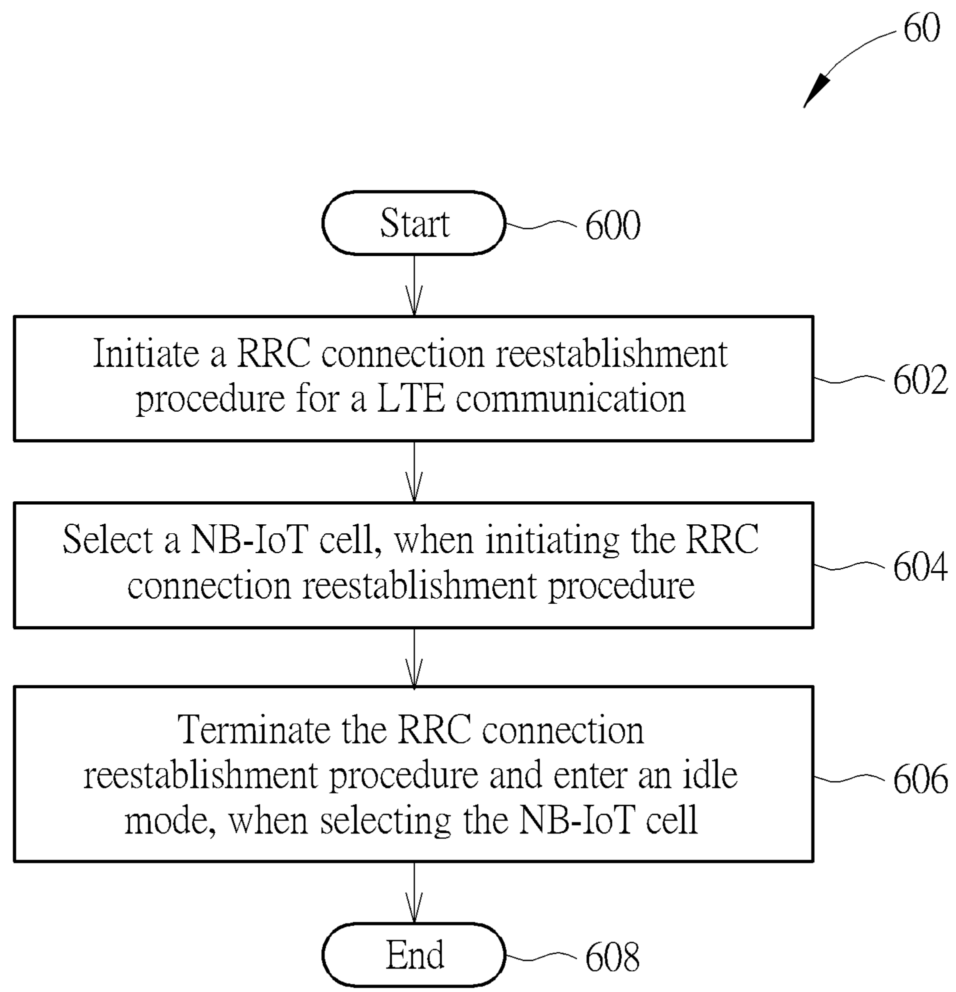
FIG. 6 is a flowchart of a process according to an example of the present invention.

FIG. 6 is a flowchart of a process 60 according to an example of the present invention. The process 60 may be utilized in a UE to communicate with a BS (e.g., in the network in FIG. 1), and includes the following steps:

Step 600: Start.

Step 602: Initiate a RRC connection reestablishment procedure for a LTE communication.

Step 604: Select a NB-IoT cell, when initiating the RRC connection reestablishment procedure.

Step 606: Terminate the RRC connection reestablishment procedure and enter an idle mode, when selecting the NB-IoT cell.

Step 608: End.

In one example, the UE may initiate a RRC connection reestablishment procedure due to detecting a RLF on a LTE cell. The UE may select a NB-IoT cell (e.g., because the UE cannot find any LTE cell) in response to the RRC connection reestablishment procedure.

In one example, the UE initiates a RRC connection establishment procedure by transmitting an RRCConnectionRequest-NB message to the NB-IoT cell, when selecting the NB-IoT cell. That is, the UE transmits the RRCConnectionRequest-NB message to the NB-IoT cell instead of an RRCConnectionReestablishmentRequest-NB message. The UE receives an RRCConnectionSetup-NB message from the NB-IoT cell in response to the RRCConnectionRequest-NB message. Thus, the UE does not need to perform the RRC connection reestablishment procedure for a NB-IoT communication. Time for performing the RRC connection reestablishment procedure is saved.

A scenario assumed according to an example of the present invention is stated as follows. An NB-IoT UE in a connected mode is not able to be handed over from a cell to another cell, because a NB-IoT communication does not support a connected mode mobility.

Figure 7:
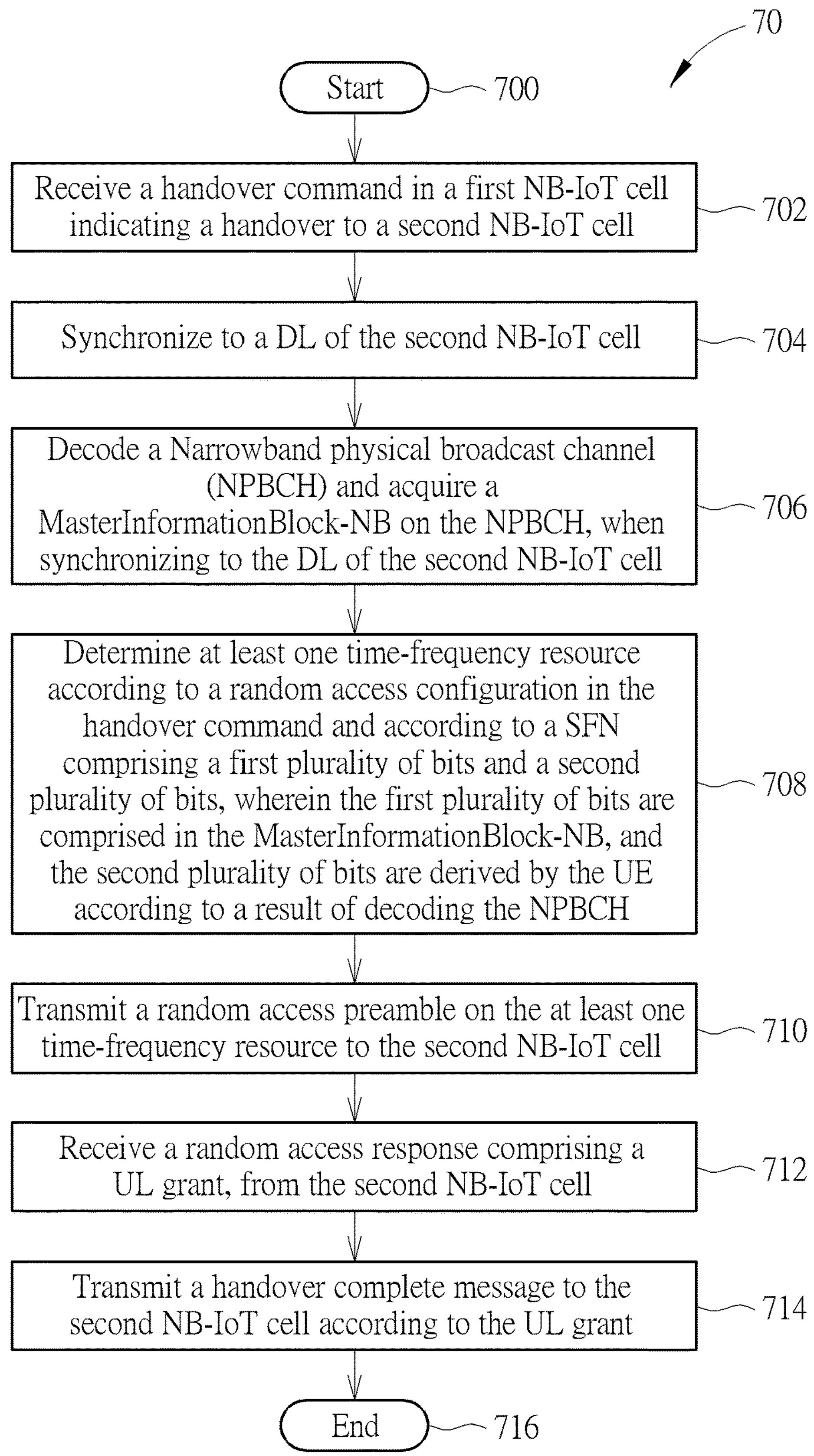
FIG. 7 is a flowchart of a process according to an example of the present invention.

FIG. 7 is a flowchart of a process 70 according to an example of the present invention. The process 70 may be utilized in a UE to communicate with a BS (e.g., in the network in FIG. 1), and includes the following steps:

Step 700: Start.

Step 702: Receive a handover command in a first NB-IoT cell indicating a handover to a second NB-IoT cell.

Step 704: Synchronize to a DL of the second NB-IoT cell.

Step 706: Decode a Narrowband physical broadcast channel (NPBCH) and acquire a MasterinformationBlock-NB on the NPBCH, when synchronizing to the DL of the second NB-IoT cell.

Step 708: Determine at least one time-frequency resource according to a random access configuration in the handover command and according to a system frame number (SFN) comprising a first plurality of bits and a second plurality of bits, wherein the first plurality of bits are comprised in the MasterinformationBlock-NB, and the second plurality of bits are derived by the UE according to a result of decoding the NPBCH.

Step 710: Transmit a random access preamble on the at least one time-frequency resource to the second NB-IoT cell.

Step 712: Receive a random access response comprising a UL grant, from the second NB-IoT cell.

Step 714: Transmit a handover complete message to the second NB-IoT cell according to the UL grant.

Step 716: End.

According to the process 70, the problem occurs in the above scenario is solved.

To synchronize to the DL of the second NB-IoT cell, the UE may synchronize to at least one DL transmission or at least one DL reference signal.

In one example, the NPBCH carries the MasterinformationBlock-NB, and is transmitted by a BS on the NB-IoT cell in a subframe #0 in every frame. The MasterinformationBlock-NB remains unchanged over a 640 ms TTI (e.g., 64 radio frames). The BS scrambles $M_{bit}$ denoting the number of bits (i.e., the encoded MasterinformationBlock-NB) to be transmitted on the NPBCH. A scrambling sequence shall be initialized with $c_{init}=N_{ID}^{Ncell}$ radio frames fulfilling a system frame number mode 64=0. After the scrambling, the BS modulates the scrambled $M_{bit}$ using a Quadrature Phase Shift Keying (QPSK) modulation scheme into complex-valued symbols. Then, the BS maps the complex-valued symbols to resource elements as below.

The complex-valued symbols $y^{(p)}(0), \ldots, y^{(p)}(M_{symb}-1)$ for each antenna port are transmitted in a subframe 0 during 64 consecutive radio frames starting in each radio frame fulfilling $n_f$mod64=0, and may be mapped in a sequence starting with $y^{(p)}(0)$ to resource elements (k,l). The mapping to resource elements (k,l) not reserved for transmission of reference signals may be in an increasing order of first the index k then the index l. After mapping to a subframe, the subframe may be repeated in the subframe 0 in the 7 following radio frames, before continuing the mapping of $y^{(p)}(\cdot)$ to the subframe 0 in the following radio frame. The first three OFDM symbols in a subframe may not be used in the mapping process.

In one example, the UE derives the second plurality of bits according to the result of decoding the NPBCH as follows. The UE identifies boundaries of a 80 ms period (e.g., 8 radio frames) by decoding at least one of a narrowband primary synchronization signal (NPSS) and a narrowband secondary synchronization signal (NSSS), and identifies a location of the 80 ms period in the 640 ms TTI by descrambling the NPBCH according to (e.g., using) a scrambling sequence. That is, the UE knows the boundaries of the 640 ms TTI according to the location. The UE derives the second plurality of bits (e.g., the least significant 6 bits) from the boundaries of the 640 ms TTI. When the UE acquires the MasterinformationBlock-NB, the UE gets the first plurality of bits (e.g., the 4 most significant bits), and constructs the system from number as the 10 bits (i.e., 4 bits+6 bits).

When the UE receives a handover command in a first LTE cell, indicating a handover to a second LTE cell, the UE may not need to acquire a SFN of the second LTE cell, when the UE determines the time-frequency resource (s) for the transmission of the random access preamble on the second LTE cell. The UE determines the time and frequency resource(s) (e.g., only) according to the random access configuration in the handover command, when the UE synchronizes to the second LTE cell (e.g., frame synchronization). The UE may acquire the SFN, after transmitting the random access preamble, after receiving the random access response or after transmitting the handover complete message.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a device and a method for handling a NB-IoT communication. Reception of system information, selection of a NB-IoT cell or a LTE cell and a handover procedure can be processed by a UE (or a NB-IoT UE) correctly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a narrowband internet of things (NB-IoT) communication, comprising:

a storage device, for storing instructions of:

initiating a radio resource control (RRC) connection reestablishment procedure for a NB-IoT communication;

selecting a NB-IoT cell, when initiating the RRC connection reestablishment procedure;

receiving a SystemInformationBlockType2-NB message broadcasted by the NB-IoT cell;

transmitting an RRCConnectionReestablishmentRequest-NB to the NB-IoT cell; and using a timeAlignmentTimerCommon comprised in the SystemInformationBlockType2-NB for an uplink (UL) transmission; and a processing circuit, coupled to the storage device, configured to execute the instructions stored in the storage device.

2. The communication device of claim 1, wherein the instruction of using the timeAlignmentTimerCommon comprises:

starting a time alignment timer according to a value in the timeAlignmentTimerCommon, when applying a timing advance command received from the NB-IoT cell.

3. The communication device of claim 2, wherein the storage device further stores the instructions of:

transmitting a random access preamble to the NB-IoT cell;

receiving a random access response comprising the timing advance command from the NB-IoT cell, in response to the transmission of the random access preamble; and transmitting the RRCConnectionReestablishmentRequest-NB, after receiving the random access response.

4. The communication device of claim 2, wherein the instruction of using the timeAlignmentTimerCommon comprises:

receiving a Medium Access Control (MAC) Protocol Data Unit (PDU) comprising the timing advance command from the NB-IoT cell, after performing the RRC connection reestablishment procedure with the NB-IoT cell.

5. A method for a communication device for handling a narrowband interne of things (NB-IoT) communication, comprising:

initiating a radio resource control (RRC) connection reestablishment procedure for a NB-IoT communication;

selecting a NB-IoT cell, when initiating the RRC connection reestablishment procedure;

receiving a SystemInformationBlockType2-NB message broadcasted by the NB-IoT cell;

transmitting an RRCConnectionReestablishmentRequest-NB to the NB-IoT cell; and using a timeAlignmentTimerCommon comprised in the SystemInformationBlockType2-NB for an uplink (UL) transmission.

6. The method of claim 5, wherein the method further comprises:

starting a time alignment timer according to a value in the timeAlignmentTimerCommon, when applying a timing advance command received from the NB-IoT cell.

7. The method of claim 6, wherein the method further comprises:

transmitting a random access preamble to the NB-IoT cell;

receiving a random access response comprising the timing advance command from the NB-IoT cell, in response to the transmission of the random access preamble; and transmitting the RRCConnectionReestablishmentRequest-NB, after receiving the random access response.

8. The method of claim 6, wherein the method further comprises:

receiving a Medium Access Control (MAC) Protocol Data Unit (PDU) comprising the timing advance command from the NB-IoT cell, after performing the RRC connection reestablishment procedure with the NB-IoT cell.

* * * * *